W. H. KRUG.
ANTISKID DEVICE FOR VEHICLES.
APPLICATION FILED JAN. 31, 1919.
1,310,536.
Patented July 22, 1919.
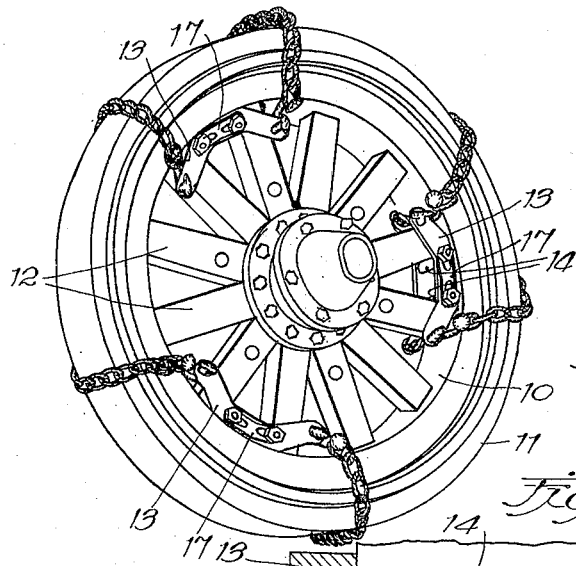
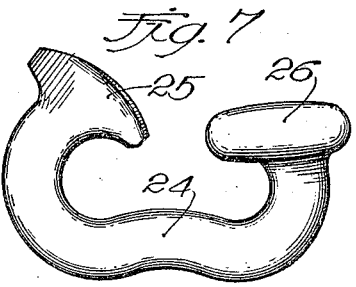
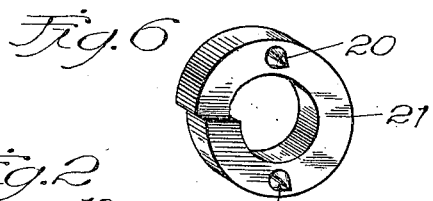
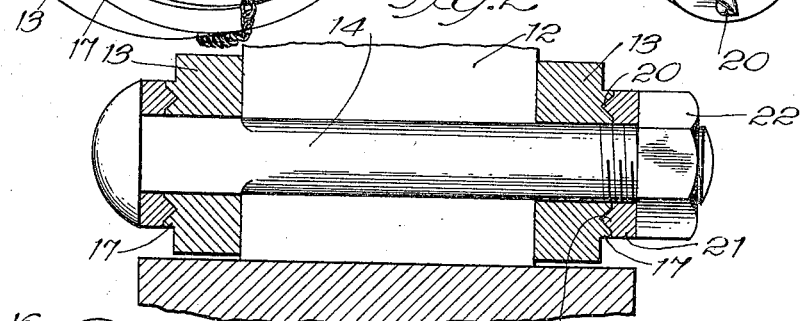
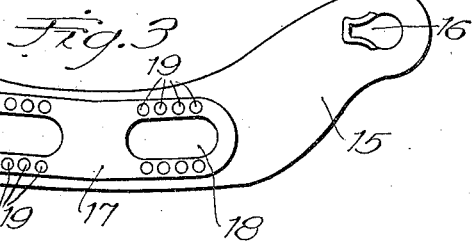
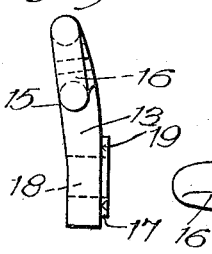
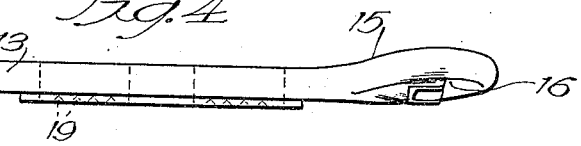
Witnesses:
Inventor
William H. Krug
attys.

UNITED STATES PATENT OFFICE.

WILLIAM H. KRUG, OF OSHKOSH, WISCONSIN.

ANTISKID DEVICE FOR VEHICLES.

1,310,536. Specification of Letters Patent. Patented July 22, 1919.

Application filed January 31, 1919. Serial No. 274,162.

*To all whom it may concern:*

Be it known that I, WILLIAM H. KRUG, a citizen of the United States, residing at Oshkosh, in the county of Winnebago and State of Wisconsin, have invented a certain new and useful Improvement in Antiskid Devices for Vehicles, of which the following is a full, clear, concise, and exact description, reference being had to the accompanying drawings, forming a part of this specification.

My invention relates to improvements in anti-skid devices for vehicles, and is particularly concerned with improvements in devices of this kind intended to be used in connection with motor trucks. My invention is not, however, limited in any sense to this use, and is applicable to other types of vehicles.

The objects of my present invention are:

First: To provide a modification of the device disclosed in my accompanying application, Case 4, Serial No. 274,161, bearing the same filing date as this application.

Second: To provide a device of the type described, comprising yielding means for locking the nuts to the clamping bolts, the yielding means comprising parts adapted to co-act with the clamping bars to prevent the bolts from shifting longitudinally of said bars. And Third: To provide a clamping bar for securing one end of an anti-skid chain to a vehicle wheel, having a slot therethrough for receiving a clamping bolt and also having a ridge formed longitudinally thereof to reinforce said clamping bar.

Other objects will appear as this description progresses, reference being had to the accompanying drawings, in which:

Figure 1 is a perspective view of a vehicle wheel having my improved device secured thereto.

Fig. 2 is a fragmentary sectional view on an enlarged scale, taken transversely of the felly of the wheel.

Fig. 3 is a side elevation of my improved clamping bar.

Fig. 4 is a plan view thereof.

Fig. 5 is an end view thereof.

Fig. 6 is a perspective view of the means which I employ for locking the nuts to the clamping bolts and for preventing the clamping bolts from shifting longitudinally of the clamping bars. And Fig. 7 is a side elevation of a coupling member which I prefer to employ for securing the ends of the anti-skid chains to the clamping bars.

Throughout the several views similar reference characters will be used to refer to similar parts.

Referring to the drawings, the reference character 10 indicates the felly of a vehicle wheel which is provided with a tire 11 of any suitable or desired type. The reference characters 12 indicate the spokes of the wheel, to adjacent ones of which the clamping bars 13 are secured by means of bolts 14.

From an inspection of Figs. 3, 4 and 5 it will be noted that the ends of the clamping bars 13 are offset inwardly, as shown at 15, and provided with key-hole slots 16. The ends of the clamping bars are also inclined to the plane of the central portion thereof, as shown in Figs. 4 and 5.

The structure thus far described is disclosed and claimed in the application of George S. Everhart, Serial No. 202,631, filed November 17, 1917, and I do not claim any of the above described features as a part of my invention, except in so far as they co-act with the structure which I am about to describe.

Each of the clamping bars 13 is provided with a rib 17 formed integrally therewith and extending longitudinally thereof, said rib constituting a reinforcement to the bar to resist the stresses imposed thereon by the clamping bolts 14. A pair of longitudinally spaced slots 18 extend through the clamping bar and the opposite ends of the rib 17, these slots being designed to receive the bolts 14 and to permit the adjustment of said bolts toward and from each other in order to secure the clamping bars 13 to wheels having the spokes thereof spaced different distances apart.

The rib 17 is provided on each side of the slots 18 with a plurality of conical-shaped depressions 19, which are designed to receive the conical-shaped projections 20 of the split locking washer 21 shown in Fig. 6. The bolts 14 are inserted through the slots 18 of the clamping bars and through a pair of locking washers 21, one of these washers being disposed to engage the head of the bolt, and the other of these washers being positioned to engage the nut 22. The projections 20 are disposed in the proper depressions 19 to position the bolts 14 so as to engage with the adjacent sides of two adjacent spokes, and the nuts 22 are then tightened to lock the washers to the clamping bars and to lock the nuts 22 against rotation. It will thus be seen that one of the locking washers 21 performs two functions,—namely, it prevents the bolt 14 from being shifted in the slot 18, and it locks the nut 22 to prevent it from becoming unloosened. The shanks of the bolts 14 are squared in cross-section adjacent the heads thereof, and these squared portions of the bolts engage with the sides of the slots in one end of the bars 13 to prevent rotation of the bolts when the nuts 22 are applied thereto.

I prefer to secure the chains 23 to the clamping bars by means of hooks such as shown in Fig. 7, these hooks comprising a shank portion 24, one end of which is provided with a crosshead 25 that can be manipulated through key-hole slots 16. The other end of the shank is provided with a head 26 adapted to engage the links at the end of the anti-skid chains. This coupling member is fully described and claimed in my accompanying patent, Serial No. 1,302,470, Apr. 29, 1919.

While I have described the details of the preferred embodiment of my invention, it is to be understood that it is not limited to these details of construction, but is capable of other adaptations and modifications within the scope of the appended claims.

Having thus described my invention, what I claim is:

1. Means for securing one end of an anti-skid chain to a wheel, comprising a clamping bar having a pair of slots extending therethrough and longitudinally thereof, a reinforcing rib extending longitudinally of said bar and on both sides of said slots, depressions formed in said rib on both sides of said slots, a pair of split locking washers provided on one side with projections for co-acting with said depressions, and bolts extending through said locking washers and slots and pressing said locking washers against said rib.

2. Means for securing one end of an anti-skid chain to a wheel, comprising a bar having a slot extending therethrough and longitudinally thereof, a reinforcing rib extending longitudinally of said bar and on both sides of said slot, depressions formed in said rib, a split locking washer provided on one side with a projection for co-acting with said depressions, and a bolt extending through said locking washer and slot and pressing said locking washer against said rib.

3. Means for securing one end of an anti-skid chain to a wheel comprising a clamping bar having a slot extending therethrough and longitudinally thereof, a reinforcing rib extending longitudinally of said bar, and on one side of said slot, a bolt extending through said slot, a nut for said bolt, and yielding means co-acting with said rib to lock said nut against rotation and to prevent said bolt from being displaced longitudinally of said slot.

4. Means for securing one end of an anti-skid chain to a wheel comprising a clamping bar, having a slot extending longitudinally thereof, a bolt extending through said slot, a nut for said bolt, and means co-acting with said bar to lock said nut against rotation, and to prevent said bolt from being displaced longitudinally of said slot.

In witness whereof I hereunto subscribe my name this 27th day of January, 1919.

WILLIAM H. KRUG.

Witnesses:
EDNA V. GUSTAFSON,
FAE PETRIE.